(12) United States Patent
Nakano et al.

(10) Patent No.: US 12,092,202 B2
(45) Date of Patent: Sep. 17, 2024

(54) CONTROL DEVICE

(71) Applicants: JATCO Ltd, Fuji (JP); NISSAN MOTOR CO., LTD., Yokohama (JP)

(72) Inventors: Yusuke Nakano, Yamato (JP); Fumikazu Nagaoka, Shizuoka (JP); Hui Jin, Kawasaki (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/264,650

(22) PCT Filed: Jan. 18, 2022

(86) PCT No.: PCT/JP2022/001519
§ 371 (c)(1),
(2) Date: Aug. 8, 2023

(87) PCT Pub. No.: WO2022/176474
PCT Pub. Date: Aug. 25, 2022

(65) Prior Publication Data
US 2024/0110624 A1    Apr. 4, 2024

(30) Foreign Application Priority Data
Feb. 22, 2021    (JP) .................. 2021-026686

(51) Int. Cl.
*F16H 57/04* (2010.01)
*F16H 57/035* (2012.01)

(52) U.S. Cl.
CPC ....... *F16H 57/0489* (2013.01); *F16H 57/035* (2013.01); *F16H 57/0424* (2013.01)

(58) Field of Classification Search
CPC ............ F16H 57/0424; F16H 57/0489; F16H 57/035; F16H 57/0423
USPC ......................................... 474/91
See application file for complete search history.

(56) References Cited

U.S. PATENT DOCUMENTS

| 11,466,770 | B2 * | 10/2022 | Fujii ................. F16H 57/021 |
| 2011/0244999 | A1 * | 10/2011 | Nakamura ........... F16H 57/023 474/140 |
| 2016/0201790 | A1 * | 7/2016 | Shibata .............. F16H 57/0489 474/8 |
| 2020/0332883 | A1 * | 10/2020 | Fujii ................. F16H 57/0471 |

FOREIGN PATENT DOCUMENTS

JP    2011-208796 A    10/2011

* cited by examiner

*Primary Examiner* — Henry Y Liu
*Assistant Examiner* — Mark K Buse
(74) *Attorney, Agent, or Firm* — Foley & Lardner LLP

(57) ABSTRACT

A hydraulic actuation device includes a case; an oil passage provided in the case; and a support member provided in the case and configured to support a supported member. The oil passage includes an opening portion that allows the oil passage to communicate with a space inside the case, the support member is inserted into the opening portion, and a communication between the oil passage and the space inside the case is blocked by the support member.

5 Claims, 10 Drawing Sheets

FIG. 2   SIDE COVER 13 SIDE

ENLARGED VIEW

CONTROL DEVICE

TECHNICAL FIELD

The present invention relates to a hydraulic actuation device.

BACKGROUND ART

Patent Literature 1 describes a chain guide provided in a chain continuously variable transmission, which is a hydraulic actuation device. The chain guide is attached to a case via a support member.

CITATION LIST

Patent Literature

Patent Literature 1: JP2011-208796 A

SUMMARY OF INVENTION

A plurality of oil passages are formed in this type of case.
A part of the oil passage is open to the case. An opening of the oil passage is sealed by a sealing member.
In the hydraulic actuation device, it is required to reduce an increase in the number of components.
A hydraulic actuation device according to an aspect of the invention includes:
  a case;
  an oil passage provided in the case; and
  a support member provided in the case and configured to support a supported member.
The oil passage has an opening portion that allows the oil passage to communicate with a space inside the case,
  the support member is inserted into the opening portion, and
  a communication between the oil passage and the space inside the case is blocked by the support member.
According to an aspect of the invention, an increase in the number of components can be reduced.

BRIEF DESCRIPTION OF DRAWINGS

FIGS. 9 and 9A are diagrams illustrating the tubular member.

DESCRIPTION OF EMBODIMENTS

Hereinafter, a chain continuously variable transmission for a vehicle will be described as an application example of a hydraulic actuation device according to an aspect of the invention.

Figure 1:
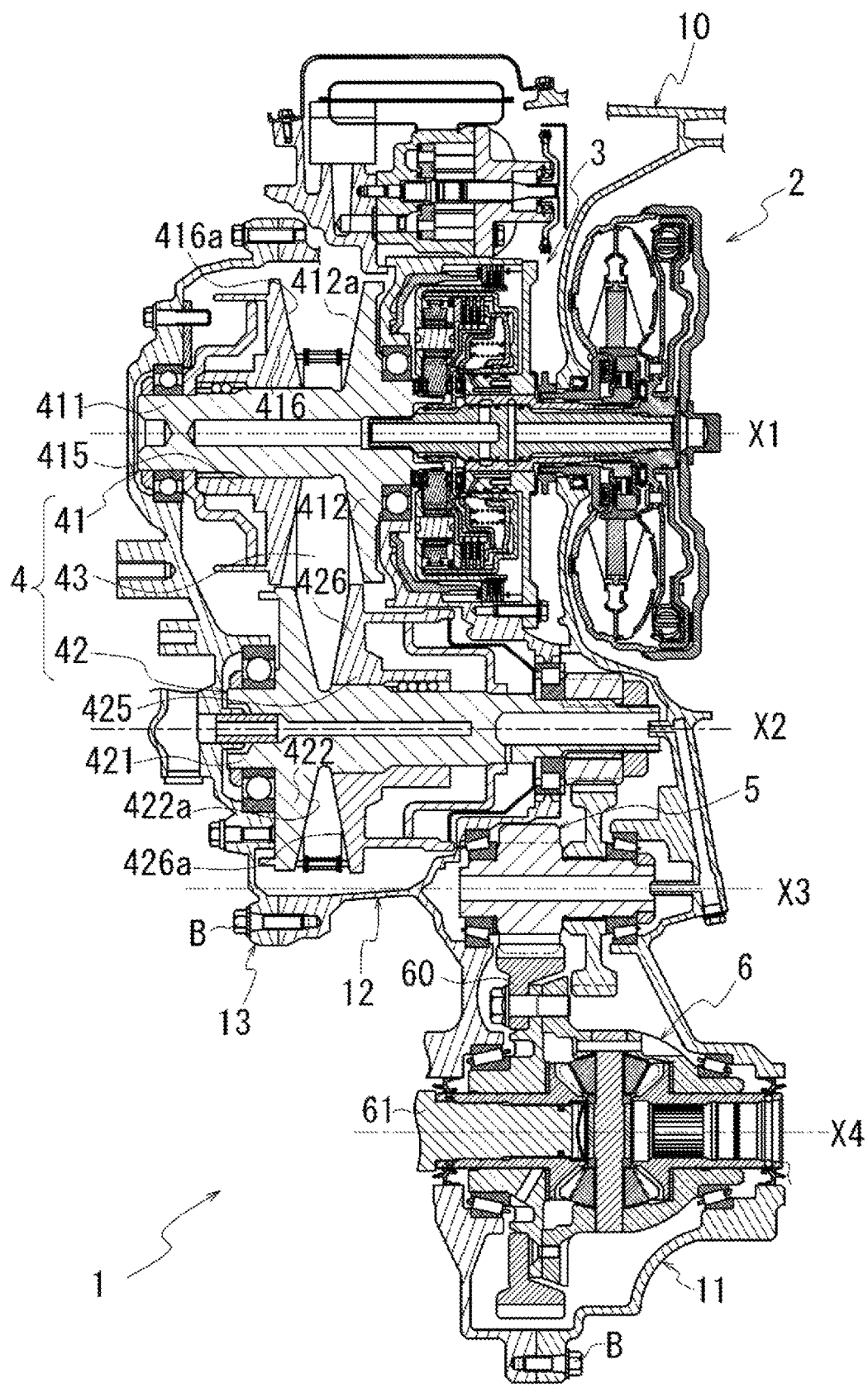
FIG. 1 is a diagram illustrating a continuously variable transmission according to the present embodiment.

FIG. 1 is a diagram illustrating a continuously variable transmission 1.
In the continuously variable transmission 1, a rotational driving force of an engine (not illustrated) is input to a variator 4 via a torque converter 2 and a forward and reverse switching mechanism 3. The rotational driving force is transmitted to a driving wheel (not illustrated) via a reduction gear 5 and a differential device 6 after being shifted by the variator 4.

The variator 4 includes a pair of pulleys (a primary pulley 41 and a secondary pulley 42) and a chain 43 wound around the pair of pulleys. The chain 43 is an endless annular member in which a plurality of link plates (not illustrated) are coupled by rocker pins (not illustrated).

The primary pulley 41 and the secondary pulley 42 are provided rotatably about rotation axes X1 and X2 that are parallel to each other.

The primary pulley 41 includes a fixed pulley 411, and a movable pulley 415 that can be displaced in a direction of the rotation axis X1.

The fixed pulley 411 and the movable pulley 415 respectively include sheave portions 412 and 416 both extending in a radial direction of the rotation axis X1. The sheave portions 412 and 416 respectively have sheave surfaces 412a and 416a facing each other. The sheave surfaces 412a and 416a are inclined with respect to the rotation axis X1.

In the primary pulley 41, a V groove around which the chain 43 is wound is provided between the sheave surfaces 412a and 416a.

In the primary pulley 41, a groove width of the V groove is changed by the displacement of the movable pulley 415 in the direction of the rotation axis X1, and a winding radius of the chain 43 in the primary pulley 41 is changed.

The secondary pulley 42 also includes a fixed pulley 421, and a movable pulley 425 that can be displaced in a direction of the rotation axis X2.

The fixed pulley 421 and the movable pulley 425 respectively include sheave portions 422 and 426 each extending in a radial direction of the rotation axis X2. The sheave portions 422 and 426 respectively have sheave surfaces 422a and 426a facing each other. The sheave surfaces 422a and 426a are inclined with respect to the rotation axis X2.

In the secondary pulley 42, a V groove around which the chain 43 is wound is provided between the sheave surfaces 422a and 426a.

In the secondary pulley 42, a groove width of the V groove is changed by the displacement of the movable pulley 425 in the direction of the rotation axis X2, and a winding radius of the chain 43 in the secondary pulley 42 is changed.

The rotational driving force of the engine is input to the primary pulley 41 via the torque converter 2 and the forward and reverse switching mechanism 3. The rotational driving force input to the primary pulley 41 is transmitted to the secondary pulley 42 via the chain 43.

At this time, by changing the winding radii of the chain 43 in the primary pulley 41 and the secondary pulley 42, the rotational driving force input to the primary pulley 41 is shifted and transmitted to the secondary pulley 42.

The rotational driving force transmitted to the secondary pulley 42 is transmitted to the reduction gear 5. The reduction gear 5 is provided rotatably about a rotation axis X3 parallel to the rotation axis X2. A final gear 60 of the differential device 6 meshes with the reduction gear 5 so as to transmit rotation.

Accordingly, the rotational driving force transmitted from the secondary pulley 42 to the reduction gear 5 is transmitted to the differential device 6 via the final gear 60. Then, a drive shaft 61 coupled to the differential device 6 rotates about a rotation axis X4 parallel to the rotation axis X3. Then, a drive wheel (not illustrated) to which the drive shaft 61 is coupled is rotated by the transmitted rotational driving force.

The torque converter 2, the forward and reverse switching mechanism 3, the variator 4, the reduction gear 5, and the differential device 6 are accommodated in a transmission case 10 (see FIG. 1).

The transmission case 10 includes a converter housing 11, a case 12, and a side cover 13. The converter housing 11, the case 12, and the side cover 13 are stacked in order in the direction of the rotation axis X1.

As illustrated in FIG. 1, the converter housing 11 accommodates the torque converter 2. The converter housing 11 is attached to an engine block (not illustrated) in the direction of the rotation axis X1. The converter housing 11 and the engine block are fixed by a bolt (not illustrated).

The case 12 accommodates the forward and reverse switching mechanism 3, the variator 4, the reduction gear 5, and the differential device 6. The case 12 is attached to the converter housing 11 in the direction of the rotation axis X1. The case 12 and the converter housing 11 are fixed by a bolt B.

The side cover 13 is attached to the case 12 in the direction of the rotation axis X1. The side cover 13 and the case 12 are fixed by the bolt B.

Figure 2:
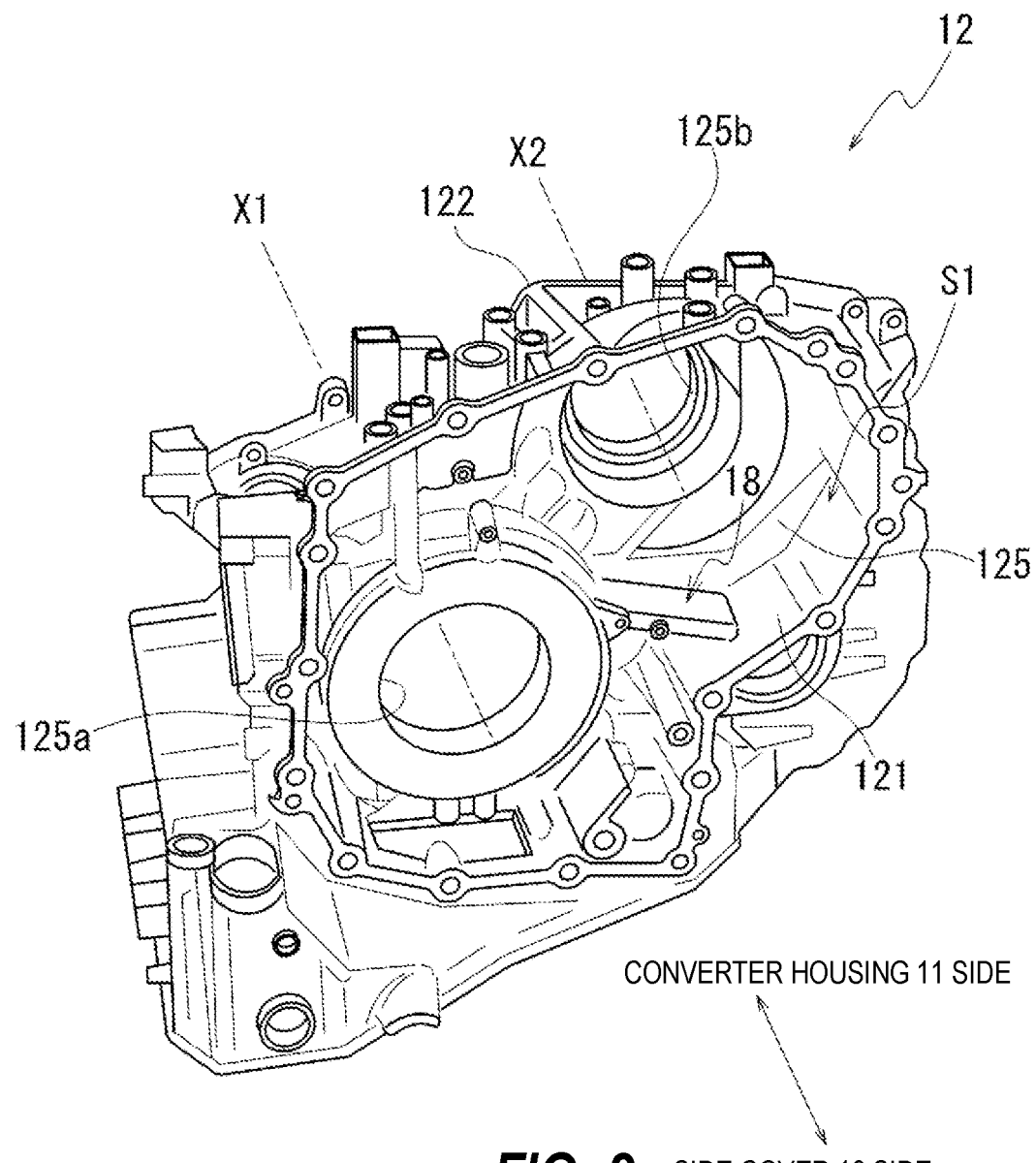
FIG. 2 is a diagram illustrating a case.

FIG. 2 is a perspective view of the case 12 as viewed from a side cover 13 side.

Figure 3:
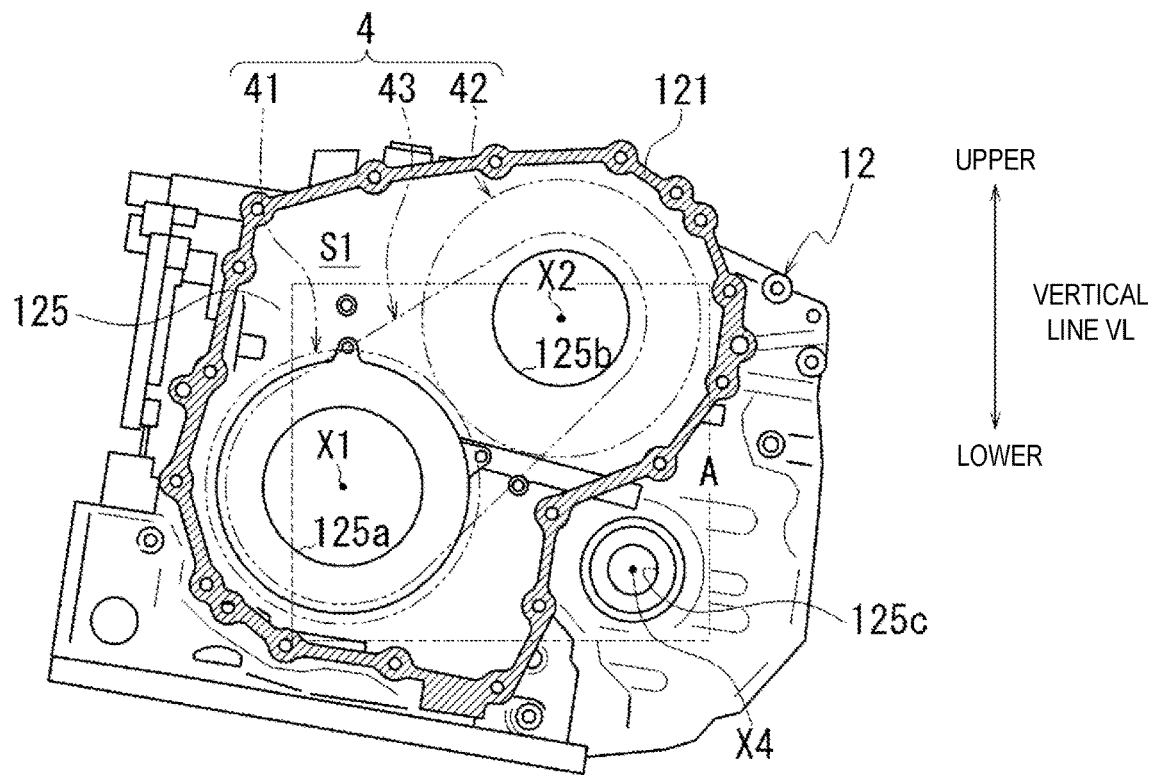
FIG. 3 is a diagram illustrating the case.

FIG. 3 is a front view of the case 12 as viewed from the side cover 13 side.

Figure 4:
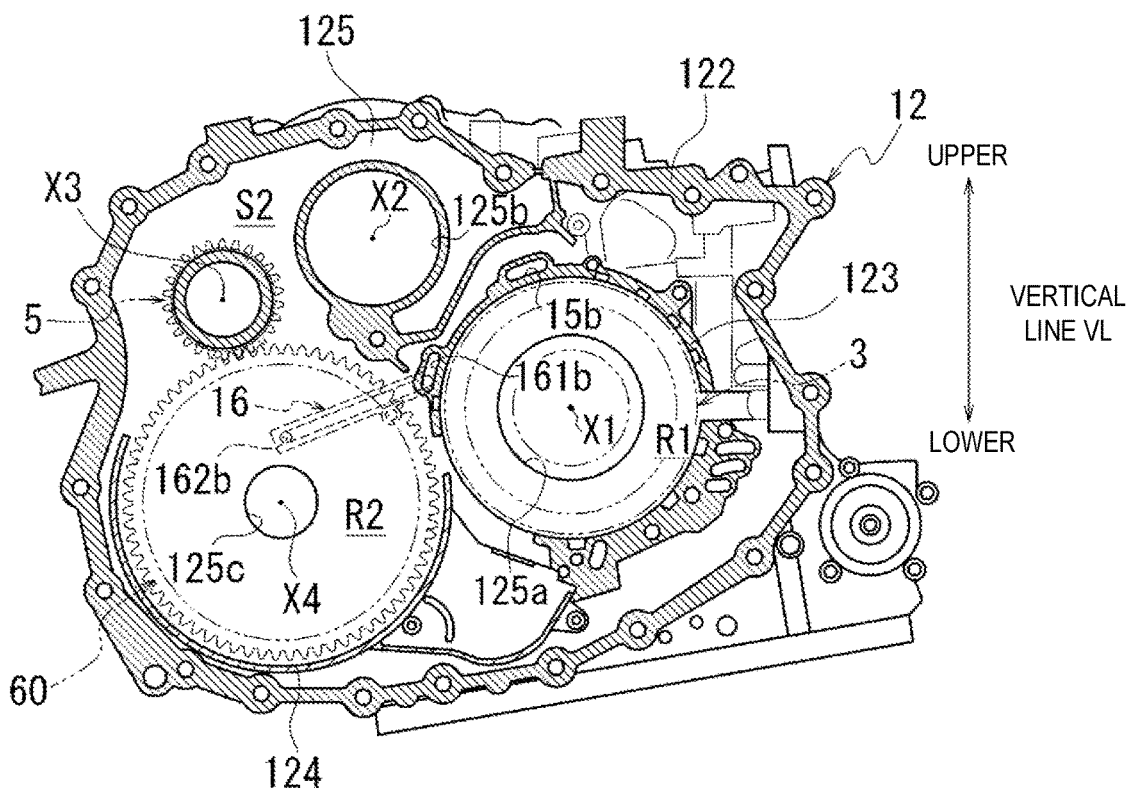
FIG. 4 is a diagram illustrating the case.

FIG. 4 is a front view of the case 12 as viewed from a converter housing 11 side.

In FIG. 3, the variator 4 is indicated by imaginary lines. In FIG. 4, the forward and reverse switching mechanism 3, the reduction gear 5, and the final gear 60 are indicated by imaginary lines.

In FIG. 3, in order to facilitate understanding of a position of a joining surface with the side cover 13, the joining surface is hatched. In FIG. 4, in order to facilitate understanding of a joining surface with the converter housing 11 and positions of arc-shaped walls 123 and 124, the joining surface and the arc-shaped walls 123 and 124 are hatched.

As illustrated in FIG. 2, the case 12 includes an intermediate wall portion 125. The intermediate wall portion 125 is formed in an internal space of the case 12. The intermediate wall portion 125 is formed in an orientation intersecting the rotation axes X1 and X2. The internal space of the case 12 is divided into a space S1 (see FIG. 3) and a space S2 (see FIG. 4) by the intermediate wall portion 125. The space S1 is located on one side (the side cover 13 side) of the intermediate wall portion 125 in the direction of the rotation axes X1 and X2, and the space S2 is located on the other side (the converter housing 11 side).

As illustrated in FIG. 3, the space S1 is a space in a recess formed by surrounding the intermediate wall portion 125 with an annular wall 121. As illustrated in FIG. 4, the space S2 is a space in a recess formed by surrounding the intermediate wall portion 125 with an annular wall 122. The annular wall 121 and the annular wall 122 extend in directions away from each other from the intermediate wall portion 125 (a front-rear direction in the paper in FIG. 2).

The variator 4 is accommodated in the space S1 of the case 12 (see the imaginary lines in FIG. 3). The forward and reverse switching mechanism 3, the reduction gear 5, and the differential device 6 (final gear 60) are accommodated in the space S2 of the case 12 (see the imaginary lines in FIG. 4).

As illustrated in FIG. 3, through holes 125a and 125b are formed in the intermediate wall portion 125 of the case 12. The through holes 125a and 125b are formed in a region intersecting the rotation axes X1 and X2 of the primary pulley 41 and the secondary pulley 42. The space S1 and the space S2 communicate with each other via the through holes 125a and 125b.

As illustrated in FIG. 4, a through hole 125c is formed in the intermediate wall portion 125 of the case 12. The through hole 125c is formed in a region intersecting the rotation axis X4 of the final gear 60. The space S2 also communicates with a region outside the annular wall 121 (a region outside the space S1) through the through hole 125c (see FIG. 3).

As illustrated in FIG. 4, on a space S2 side of the intermediate wall portion 125, the arc-shaped wall 123 surrounding the through hole 125a and the arc-shaped wall 124 surrounding the through hole 125c are formed. A region surrounded by the arc-shaped wall 123 in the space S2 constitutes an accommodation chamber R1 accommodating the forward and reverse switching mechanism 3. A region surrounded by the arc-shaped wall 124 in the space S2 constitutes a differential chamber R2 accommodating the final gear 60.

As illustrated in FIG. 3, the variator 4 is accommodated in the space S1 of the case 12. The chain 43 is wound around the primary pulley 41 and the secondary pulley 42 in the space S1.

In a region between the primary pulley 41 and the secondary pulley 42, the chain 43 tends to vibrate because the chain 43 is not in contact with the sheave surfaces 412a and 416a (see FIG. 1) or the sheave surfaces 422a and 426a (see FIG. 1). Therefore, the continuously variable transmission 1 includes chain guides 9A and 9B (see FIG. 5) for reducing the vibration of the chain 43.

Figure 5:
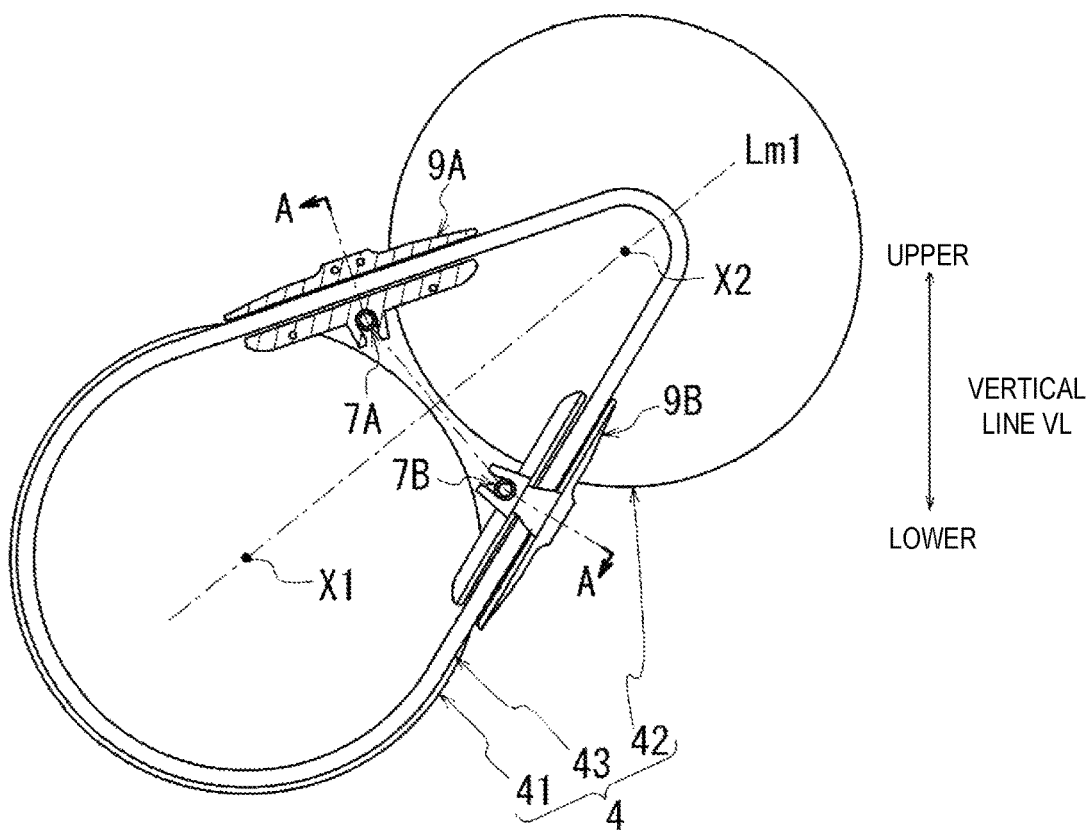
FIG. 5 is a diagram illustrating an arrangement of chain guides in a variator.

FIG. 5 is a diagram illustrating an arrangement of the chain guides 9A and 9B in the variator 4.

FIG. 5 corresponds to the variator 4 indicated by the imaginary lines in FIG. 3. In addition, in FIG. 5, for convenience of description, the chain guide 9A is illustrated in a schematic view of a cross section thereof, and the chain guide 9B is illustrated in a side view. Further, the chain 43 is illustrated in a simplified manner.

As illustrated in FIG. 5, the chain guides 9A and 9B are arranged in a region in which the chain 43 is not wound around the primary pulley 41 and the secondary pulley 42.

The chain guides 9A and 9B are arranged in a symmetrical positional relationship with respect to a straight line Lm1. The straight line Lm1 is a line connecting the rotation axis X1 of the primary pulley 41 and the rotation axis X2 of the secondary pulley 42.

The chain guide 9A and the chain guide 9B are respectively disposed on an upper side and a lower side of the straight line Lm1 in a direction of a vertical line VL. The vertical line VL is a line based on a state where the continuously variable transmission 1 is mounted on the vehicle.

As illustrated in FIG. 5, the chain guide 9A is swingably coupled to a chain guide support shaft 7A. The chain guide 9B is swingably coupled to a chain guide support shaft 7B. The chain guide support shafts 7A and 7B are arranged in a symmetrical positional relationship with respect to the straight line Lm1.

When viewed from the direction of the rotation axes X1 and X2, the chain guide support shafts 7A and 7B are arranged on an inner side of the chain 43. The chain guide support shafts 7A and 7B are supported by tubular members 8A and 8B, respectively, which will be described later.

The chain guides 9A and 9B according to the present embodiment have the same shape. In the following description, the chain guide 9B will be described as an example. Description of the chain guide 9A will be omitted.

Figure 6:
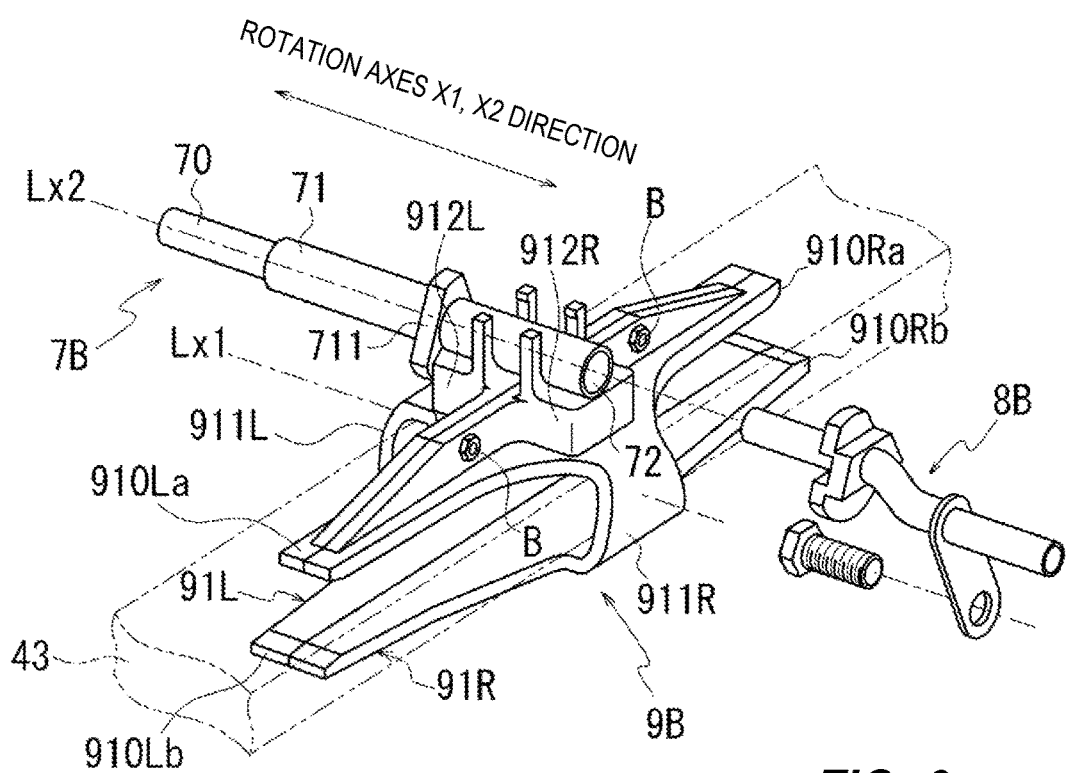
FIG. 6 is a diagram illustrating the chain guide.

FIG. 6 is a diagram illustrating the chain guide 9B and is a perspective view of the chain guide 9B as viewed from an intermediate wall portion 125 side. In FIG. 6, a tubular member 8B is separated from the chain guide support shaft 7B.

Figure 7:
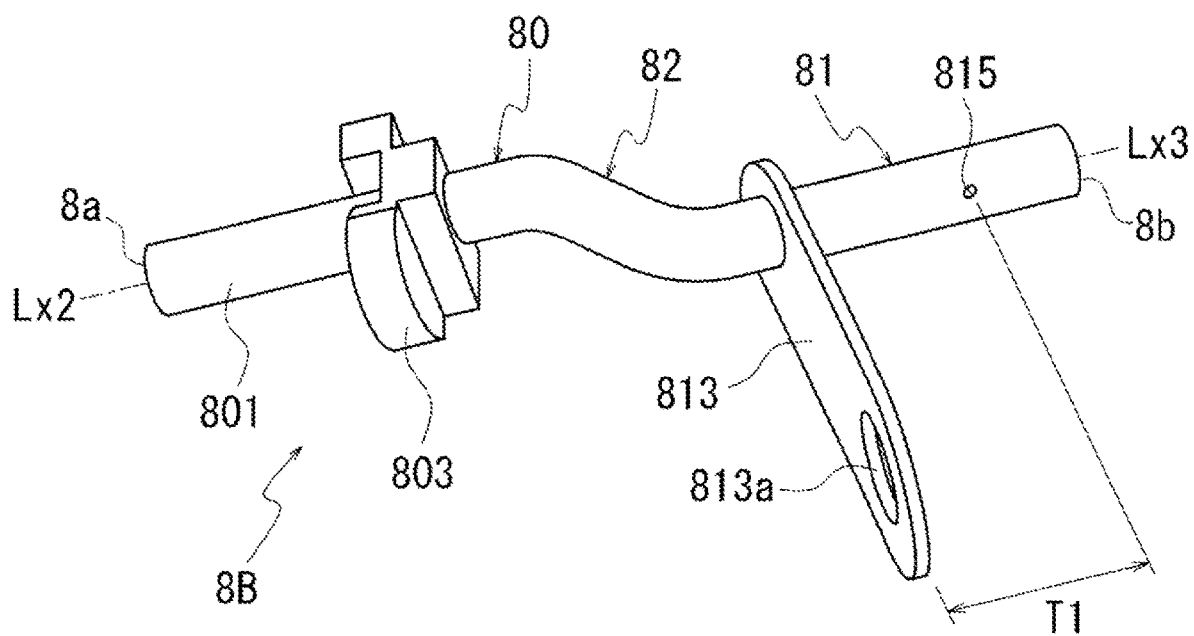
FIG. 7 is a diagram illustrating a tubular member.

FIG. 7 is a perspective view illustrating the tubular member 8B.

Figure 8:
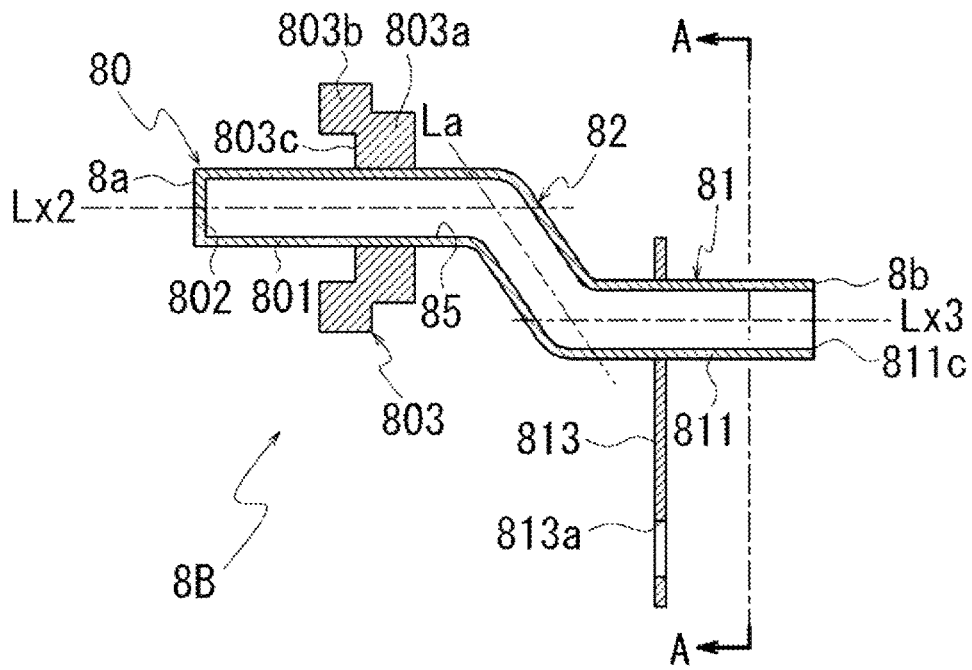
FIG. 8 is a diagram illustrating the tubular member.

FIG. 8 is a diagram illustrating the tubular member 8B and is a schematic view of a cross section obtained by cutting the tubular member 8B of FIG. 7 along a longitudinal direction thereof.

Figure 9:
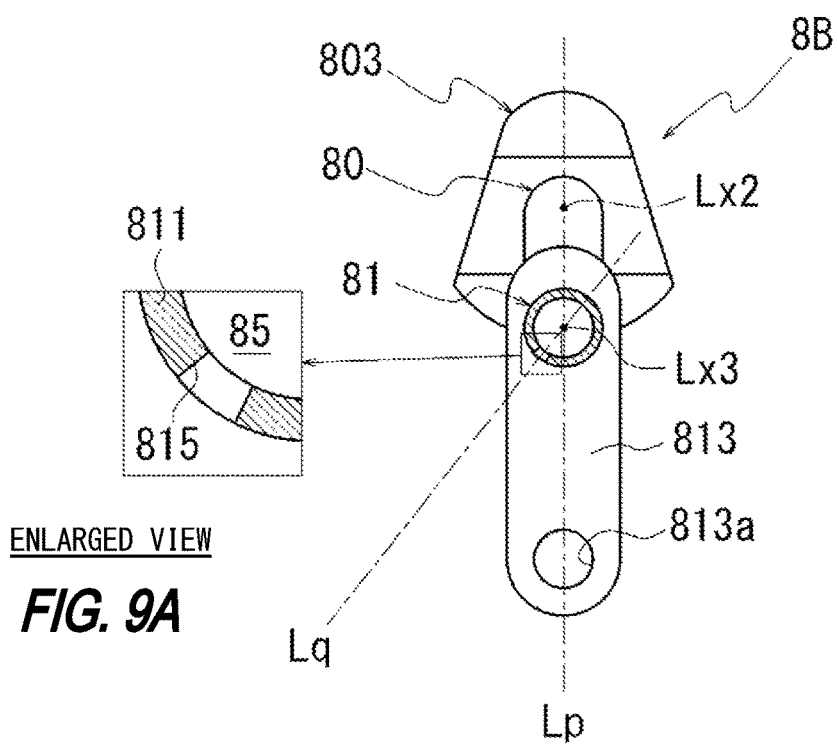

FIGS. 9 and 9A are diagrams illustrating the tubular member 8B and is a schematic view of an A-A cross section in FIG. 8.

Figure 10:
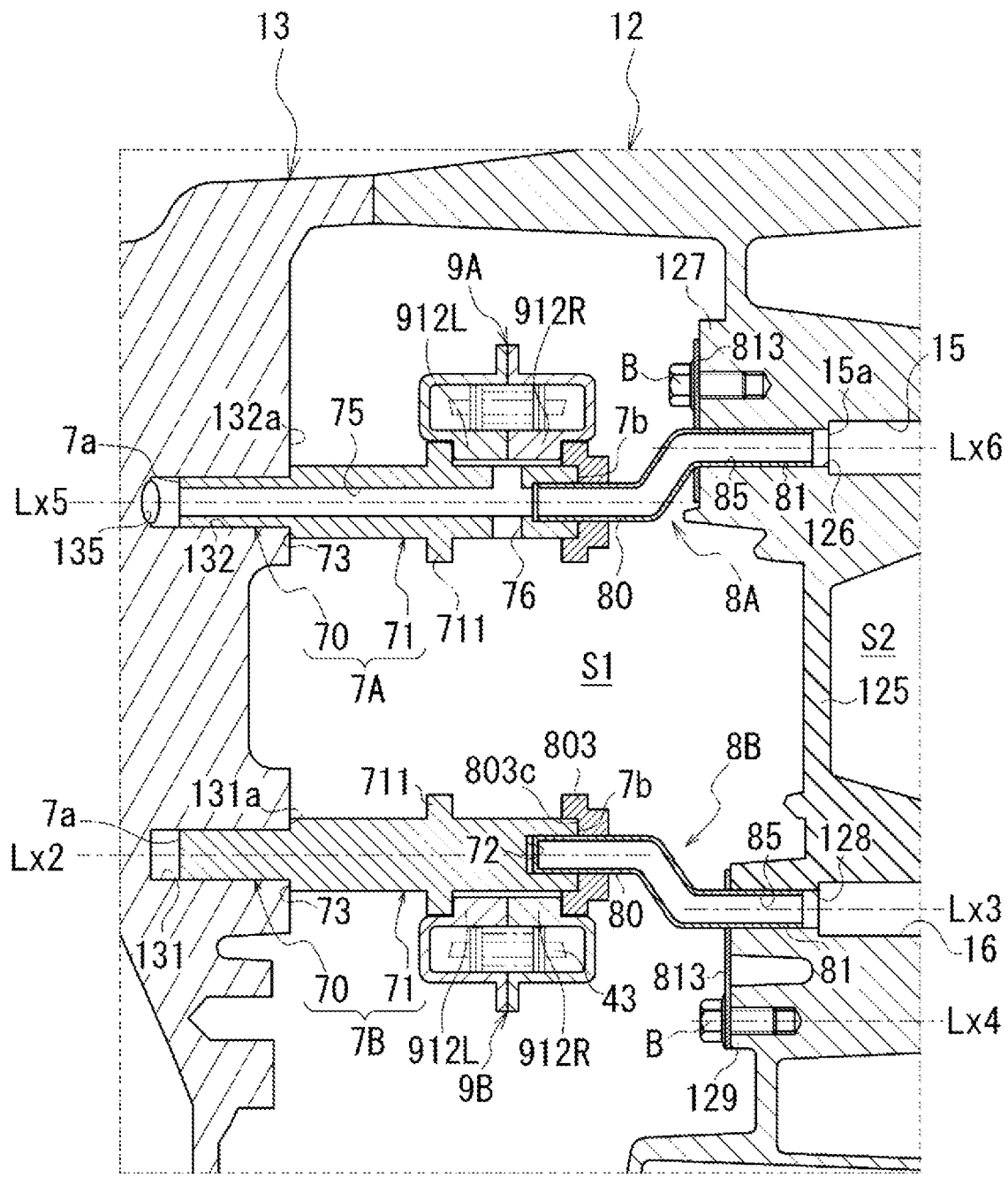
FIG. 10 is a diagram illustrating an arrangement of tubular members.

FIG. 10 is a diagram illustrating an arrangement of the tubular members 8A and 8B in the space S1 and is a schematic view of an A-A cross section in FIG. 5.

As illustrated in FIG. 6, the chain guide 9B includes a pair of guide members 91R and 91L. The guide members 91R and 91L have the same shape. The chain guide 9B is formed with the guide members 91R and 91L overlapped in a direction of a straight line Lx1 parallel to the rotation axes X1 and X2.

The guide member 91R includes guide portions 910Ra and 910Rb and a connection portion 911R that connects the guide portions 910Ra and 910Rb to each other. The guide portions 910Ra and 910Rb are arranged on one side and the other side in a thickness direction (an up-down direction in FIG. 6) of the chain 43. The connection portion 911R is disposed on a lateral side (a right side in FIG. 6) of the chain 43.

The guide portions 910Ra and 910Rb and the connection portion 911R of the guide member 91R are integrally formed of the same material. The guide portions 910Ra and 910Rb are plate-shaped members arranged along a longitudinal direction of the chain 43. The connection portion 911R connects central portions of the guide portions 910Ra and 910Rb in a longitudinal direction to each other.

The guide member 91L includes guide portions 910La and 910Lb and a connection portion 911L that connects the guide portions 910La and 910Lb to each other. The guide portions 910La and 910Lb are arranged on one side and the other side in the thickness direction (the up-down direction in FIG. 6) of the chain 43. The connection portion 911L is disposed on a lateral side (a left side in FIG. 6) of the chain 43.

The guide portions 910La and 910Lb and the connection portion 911L of the guide member 91L are integrally formed of the same material. The guide portions 910La and 910Lb are plate-shaped members arranged along the longitudinal direction of the chain 43. The connection portion 911L connects central portions of the guide portions 910La and 910Lb in a longitudinal direction to each other.

The guide members 91R and 91L are overlapped with each other in the direction of the straight line Lx1. The guide portions 910Ra and 910La are in contact with each other and the guide portions 910Rb and 910Lb are in contact with each other over an entire length of the chain 43 in the longitudinal direction thereof.

The chain 43 is disposed in a space surrounded by the guide portions 910Ra and 910Rb and the connection portion 911R of the guide member 91R and the guide portions 910La and 910Lb and the connection portion 911L of the guide member 91L.

Here, the guide members 91R and 91L respectively include coupling portions 912R and 912L coupled to the chain guide support shaft 7B. The coupling portions 912R and 912L are also integrally formed with the guide portions 910Ra and 910La, respectively.

The coupling portions 912R and 912L are respectively formed at central portions of the guide portions 910Ra and 910La in the longitudinal direction thereof. The coupling portions 912R and 912L are overlapped with each other in the direction of the straight line Lx1 and coupled by the bolts B. Accordingly, the guide members 91R and 91L are maintained in a state of being overlapped with each other in the direction of the straight line Lx1.

[Chain Guide Support Shaft 7B]

As illustrated in FIG. 6, the chain guide support shaft 7B is a shaft-shaped member disposed in an orientation along an axis line Lx2 parallel to the rotation axes X1 and X2. The chain guide support shaft 7B includes a small-diameter shaft portion 70 and a large-diameter shaft portion 71.

As illustrated in FIG. 10, in the chain guide support shaft 7B, the small-diameter shaft portion 70 is one end 7a side (a left side in the diagram) in a direction of the axis line Lx2, and the large-diameter shaft portion 71 is on the other end 7b side (a right side in the diagram). A stepped surface 73 is formed at a boundary between the small-diameter shaft portion 70 and the large-diameter shaft portion 71. The stepped surface 73 is a flat surface orthogonal to the axis line Lx2.

The small-diameter shaft portion 70 of the chain guide support shaft 7B is inserted into an insertion hole 131 of the side cover 13 from the direction of the axis line Lx2. The stepped surface 73 of the chain guide support shaft 7B abuts on a peripheral edge portion 131a of the insertion hole 131 from the direction of the axis line Lx2.

The large-diameter shaft portion 71 of the chain guide support shaft 7B includes a flange-shaped support plate 711. The support plate 711 is formed at an intermediate position of the large-diameter shaft portion 71 in the direction of the axis line Lx2. The intermediate position of the large-diameter shaft portion 71 is between one end and the other end of the large-diameter shaft portion 71 in the direction of the axis line Lx2.

The support plate 711 extends radially outward of the axis line Lx2 from an outer periphery of the large-diameter shaft portion 71. The support plate 711 surrounds the large-diameter shaft portion 71 over an entire circumference in a circumferential direction around the axis line Lx2 (see FIG. 6).

As illustrated in FIG. 10, an insertion hole 72 is opened in the other end 7b of the chain guide support shaft 7B. The insertion hole 72 extends in the direction of the axis line Lx2 inside the large-diameter shaft portion 71. The tubular member 8B is inserted into the insertion hole 72 from the direction of the axis line Lx2 (see FIG. 6).

[Tubular Member 8B]

As illustrated in FIG. 7, the tubular member 8B is formed by bending one steel pipe at two locations between one end and the other end thereof in the longitudinal direction.

Specifically, as illustrated in FIG. 8, the tubular member 8B includes a first tubular portion 80 disposed in the orientation along the axis line Lx2, and a second tubular portion 81 disposed in an orientation along an axis line Lx3.

The axis line Lx3 is parallel to the axis line Lx2. The first tubular portion 80 and the second tubular portion 81 are connected to each other via a tubular connection portion 82. The first tubular portion 80 is located on one end 8a side (a left side in the diagram) of the tubular member 8B in the longitudinal direction, and the second tubular portion 81 is located on the other end 8b side (a right side in the diagram).

As illustrated in FIG. 8, the first tubular portion 80 includes a bottom wall portion 802 orthogonal to the axis line Lx2, and a tubular wall portion 801 surrounding an entire outer periphery of the bottom wall portion 802.

The tubular wall portion 801 extends from the bottom wall portion 802 to the other side (a right side in the diagram) in the direction of the axis line Lx2. The tubular wall portion 801 is connected to the connection portion 82 on the other side in the direction of the axis line Lx2.

The connection portion 82 is disposed in an orientation along an axis line La intersecting the axis line Lx2 and the axis line Lx3. The connection portion 82 is connected to the second tubular portion 81 on a side opposite to the first tubular portion 80 in a direction of the axis line La.

The second tubular portion 81 includes a tubular wall portion 811 surrounding the axis line Lx3. The tubular wall portion 811 extends from the connection portion 82 to the other side (the right side in the diagram) in a direction of the axis line Lx3. The tubular wall portion 811 has an opening end 811c at an end surface (the other end 8b) on the other side in the direction of the axis line Lx3.

The tubular member 8B has a bottomed tubular shape as a whole. Internal spaces of the first tubular portion 80, the connection portion 82, and the second tubular portion 81 communicate with one another, and one oil passage 85 is formed inside the tubular member 8B. One end of the oil passage 85 is sealed by the bottom wall portion 802 of the first tubular portion 80. The other end of the oil passage 35 communicates with an outside through the opening end 811c of the second tubular portion 81.

As illustrated in FIG. 8, a flange-shaped support plate 803 is formed at the first tubular portion 80 of the tubular member 8B. The support plate 803 is formed at an intermediate position of the tubular wall portion 801 in the direction of the axis line Lx2. The intermediate position of the tubular wall portion 801 is between one end and the other end of the tubular wall portion 801 in the direction of the axis line Lx2. The support plate 803 extends radially outward of the axis line Lx2 from an outer periphery of the tubular wall portion 801. The support plate 803 surrounds the tubular wall portion 801 over the entire circumference in the circumferential direction around the axis line Lx2 (see FIG. 9).

The support plate 803 includes an inner-diameter side region 803a and an outer-diameter side region 803b in a radial direction (the up-down direction in the diagram) of the axis line Lx2. The inner-diameter side region 803a is offset to the other side (the right side in the diagram) in the direction of the axis line Lx2 with respect to the outer-diameter side region 803b. The support plate 803 includes a recess 803c inside the outer-diameter side region 803b in the radial direction of the axis line Lx2.

As illustrated in FIG. 8, the second tubular portion 81 includes a strip-shaped bracket 813. The bracket 813 is formed at an intermediate position of the tubular wall portion 811 in the direction of the axis line Lx3. The intermediate position of the tubular wall portion 811 is between one end and the other end of the tubular wall portion 811 in the direction of the axis line Lx3. The bracket 813 is fixed to the tubular wall portion 811 with a thickness direction being along the direction of the axis line Lx3.

As illustrated in FIG. 9 FIGS. 9 and 9A, when viewed from the direction of the axis line Lx3, a straight line Lp along a longitudinal direction of the bracket 813 intersects the axis line Lx2 and the axis line Lx3.

The tubular wall portion 811 is located on one side (an upper side in the diagram) of the bracket 813 in a direction of the straight line Lp. A through hole 813a penetrating the bracket 813 in the thickness direction thereof is formed on the other side (a lower side in the diagram) of the bracket 813 in the direction of the straight line Lp.

As illustrated in FIG. 7, a through hole 815 penetrating the tubular wall portion 811 in the thickness direction thereof is formed in the tubular wall portion 811 of the second tubular portion 81. The through hole 815 is located on the other end 8b side of the tubular member 8B. A distance between the through hole 815 and the bracket 813 in the direction of the axis line Lx3 is set to T1.

As illustrated in FIGS. 9 and 9A, the through hole 815 allows an outside of the tubular member 8B to communicate with the oil passage 85. In addition, when viewed from the direction of the axis line Lx3, the through hole 815 is displaced from the straight line Lp in a circumferential direction around the axis line Lx3. A straight line Lq that connects the through hole 815 and the axis line Lx3 is inclined with respect to the straight line Lp along the longitudinal direction of the bracket 813.

As illustrated in FIG. 10, the first tubular portion 80 of the tubular member 8B is inserted into the insertion hole 72 of the chain guide support shaft 7B from the direction of the axis line Lx2.

In addition, the second tubular portion 81 of the tubular member 8B is inserted into an insertion hole 128 formed in the intermediate wall portion 125. The second tubular portion 81 is inserted into the insertion hole 128 from the direction of the axis line Lx3. A boss portion 129 is formed on the intermediate wall portion 125 of the case 12. The bracket 813 is fixed to the boss portion 129 with the bolt B from a direction of an axis line Lx4 parallel to the axis line Lx3.

The insertion hole 128 and the boss portion 129 are formed below the straight line Lm1 in the intermediate wall portion 125 (see FIGS. 11 and 11A).

In this state, the chain guide support shaft 7B and the tubular member 8B are attached across the side cover 13 and the case 12. The chain guide support shaft 7B and the tubular member 8B cross the space S1 in a direction along the axis line Lx2.

As illustrated in FIG. 10, the support plate 711 of the chain guide support shaft 7B and the support plate 803 of the tubular member 8B are spaced apart from each other in the direction of the axis line Lx2. The coupling portions 912L and 912R of the chain guide 9B described above are arranged between the support plate 711 and the support plate 803 in the direction of the axis line Lx2.

Vibration of a chain 43 is finally dispersed to the case 12 and the side cover 13 through the chain guide support shaft 7B and the tubular member 8B after being received by the chain guide 9B. Accordingly, the vibration of the chain 43 is reduced.

Here, as illustrated in FIG. 10, the first tubular portion 80 of the tubular member 8B is inserted into the insertion hole 72 of the chain guide support shaft 7B, and the recess 803c of the support plate 803 accommodates the other end 7b side of the chain guide support shaft 7B. Accordingly, the tubular member 8B supports the chain guide support shaft 7B while preventing the chain guide support shaft 7B itself from vibrating in the radial direction of the axis line Lx2 due to the vibration of the chain 43.

That is, in a relationship between the tubular member 8B and the chain guide support shaft 7B, the tubular member 8B serves as a support member, and the chain guide support shaft 7B serves as a supported member.

As illustrated in FIG. 10, the chain guide 9A also includes the coupling portions 912L and 912R. The chain guide 9A is coupled to the chain guide support shaft 7A via the coupling portions 912L and 912R.

The chain guide support shaft 7A is one shaft-shaped member and has the same basic shape as that of the chain guide support shaft 7B described above.

Hereinafter, the chain guide support shaft 7A will be described.

In the following description, a portion of the chain guide support shaft 7A different from the chain guide support shaft 7B will be described. The same portions as those of the chain guide support shaft 7B will be described with the same reference numerals.

As illustrated in FIG. 10, the chain guide support shaft 7A is disposed in an orientation along an axis line Lx5 parallel to the rotation axes X1 and X2 (see FIG. 6).

The chain guide support shaft 7A includes the small-diameter shaft portion 70 and the large-diameter shaft portion 71. The small-diameter shaft portion 70 is located on the one end 7a side of the chain guide support shaft 7A in a direction of the axis line Lx5, and the large-diameter shaft portion 71 is located on the other end 7b side.

As illustrated in FIG. 10, the small-diameter shaft portion 70 of the chain guide support shaft 7A is inserted into an insertion hole 132 of the side cover 13 from the direction of the axis line Lx5. The stepped surface 73 of the chain guide support shaft 7A abuts on a peripheral edge portion 132a of the insertion hole 132 from the direction of the axis line Lx5.

An oil passage 75 extending in the direction of the axis line Lx5 is formed inside the chain guide support shaft 7A. The oil passage 75 penetrates the small-diameter shaft portion 70 and the large-diameter shaft portion 71 in the direction of the axis line Lx5. The oil passage 75 is opened at one end 7a and the other end 7b of the chain guide support shaft 7A.

As illustrated in FIG. 10, in the large-diameter shaft portion 71, an injection hole 76 is formed in a region between the support plate 711 and the other end 7b in the direction of the axis line Lx5. The injection hole 76 penetrates the large-diameter shaft portion 71 in a direction orthogonal to the axis line Lx5 and allows the oil passage 75 to communicate with the space S1.

The tubular member 8A is inserted into the oil passage 75 of the chain guide support shaft 7A from the other end 7b side.

The tubular member 8A is formed by bending one steel pipe at two locations between one end and the other end thereof in the longitudinal direction and has the same basic shape as that of the tubular member 8B described above.

Hereinafter, the tubular member 8A will be described.

In the following description, a portion of the tubular member 8A different from the tubular member 8B will be described. The same portions as those of the tubular member 8B will be described with the same reference numerals.

The tubular member 8A is different from the tubular member 8B in that the tubular member 8A does not include the bottom wall portion 802 of the first tubular portion 80 and the oil passage 85 is opened at both ends in the longitudinal direction. In addition, the tubular member 8A is different from the tubular member 8B in that the tubular member 8A does not include the through hole 815 in the second tubular portion 81.

As illustrated in FIG. 10, in the tubular member 8A, the first tubular portion 80 is inserted into the oil passage 75 of the chain guide support shaft 7A from the direction of the axis line Lx5. In the tubular member 8A, the second tubular portion 81 is inserted into an insertion hole 126 formed in the intermediate wall portion 125. The second tubular portion 81 is inserted into the insertion hole 126 from a direction of an axis line Lx6 parallel to the axis line Lx5. The bracket 813 is fixed to a boss portion 127 formed on the intermediate wall portion 125 of the case 12 with the bolt B. The insertion hole 126 and the boss portion 127 are formed above the straight line Lm1 in the intermediate wall portion 125 (see FIG. 11).

In this state, the chain guide support shaft 7A and the tubular member 8A are attached across the side cover 13 and the case 12. The chain guide support shaft 7A and the tubular member 8A cross the space S1 in a direction along the axis line Lx5.

Here, as illustrated in FIG. 10, the insertion hole 126 into which the second tubular portion 81 of the tubular member 8A is inserted communicates with an in-case oil passage 15 in the intermediate wall portion 125. In addition, the insertion hole 128 into which the second tubular portion 81 of the tubular member 8B is inserted communicates with an in-case oil passage 16 in the intermediate wall portion 125.

The in-case oil passages 15 and 16 are lubricating oil passages for supplying lubricating oil OL in the case 12, which is raised by the rotation of the final gear 60 (see FIG. 4), to a predetermined region in the case 12.

[In-Case Oil Passage 15]

As illustrated in FIG. 10, the in-case oil passage 15 extends in the direction of the axis line Lx6 in the intermediate wall portion 125. The other end 15b of the in-case oil passage 15 in the direction of the axis line Lx6 is opened in the arc-shaped wall 123 (see FIG. 4) in the space S2 side described above. The insertion hole 126 is connected to one end 15a of the in-case oil passage 15 in the direction of the axis line Lx6.

The insertion hole 126 extends in the direction of the axis line Lx6. An end portion of the insertion hole 126 on a side (a space S1 side) opposite to the in-case oil passage 15 in the direction of the axis line Lx6 is opened in a surface of the intermediate wall portion 125 (see FIG. 11). The in-case oil passage 15 communicates with the space S1 via the insertion hole 126. The insertion hole 126 constitutes a part of the in-case oil passage 15.

The first tubular portion 80 of the tubular member 8A is inserted into the oil passage 75 in the chain guide support shaft 7A, and the second tubular portion 81 is inserted into the insertion hole 126. Accordingly, the oil passage 85 in the tubular member 8A communicates with the oil passage 75 of the chain guide support shaft 7A on a first tubular portion 80 side and communicates with the in-case oil passage 15 on a second tubular portion 81 side.

An oil passage 135 formed in the side cover 13 communicates with the insertion hole 132 of the side cover 13 into which the small-diameter shaft portion 70 of the chain guide support shaft 7A is inserted.

Therefore, the in-case oil passage 15 communicates with the oil passage 135 of the side cover 13 via the oil passage 85 in the tubular member 8A and the oil passage 75 in the chain guide support shaft 7A.

Accordingly, a part of the lubricating oil OL that is raised by the rotation of the final gear 60 flows from the other end 15b (see FIG. 4) of the in-case oil passage 15 and is supplied from the one end 15a to the oil passage 85 in the tubular member 8A. Then, the lubricating oil OL supplied to the oil passage 85 finally moves to the oil passage 135 in the side cover 13 through the oil passage 75 in the chain guide support shaft 7A. A part of the lubricating oil OL passing through the oil passage 75 is injected from the injection hole 76 to lubricate the chain 43.

[In-Case Oil Passage 16]

The in-case oil passage 16 is formed in a rib 18 (see FIG. 2) provided on the intermediate wall portion 125. The rib 18 protrudes from the intermediate wall portion 125 to the space S1 side (a front side in the paper in FIG. 2) in the direction of the rotation axes X1 and X2.

Figure 11:
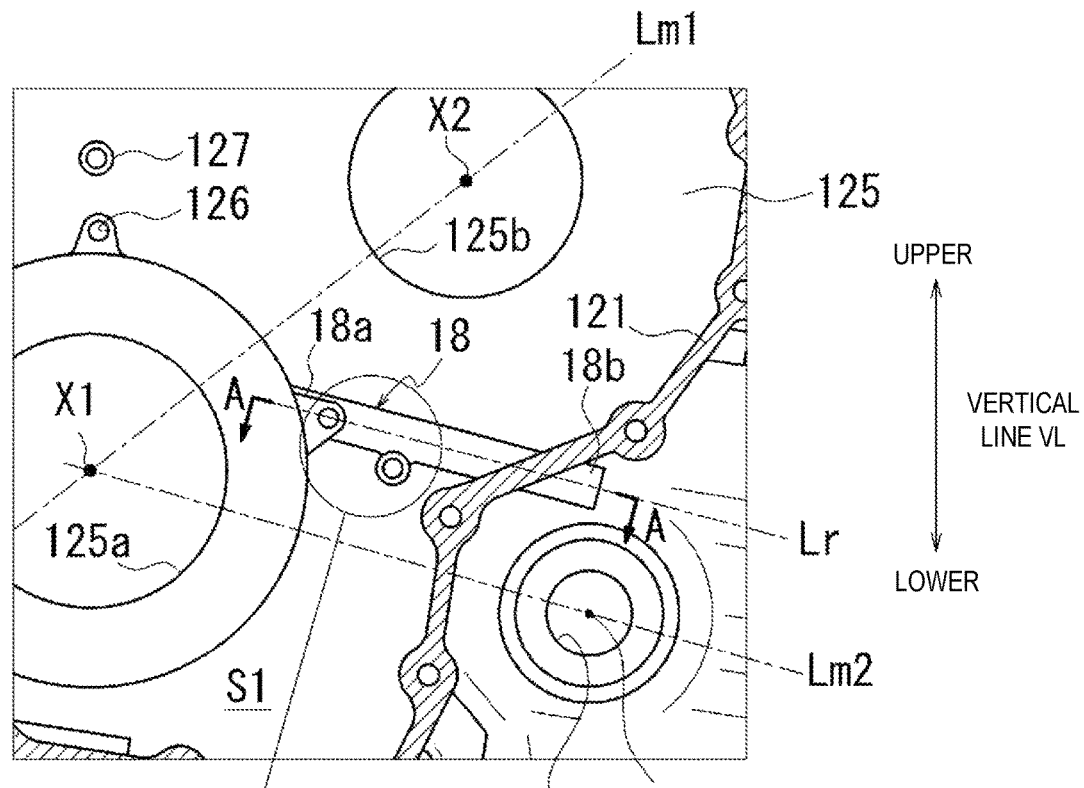
FIGS. 11 and 11A are diagrams illustrating a rib.
Figure 11A:
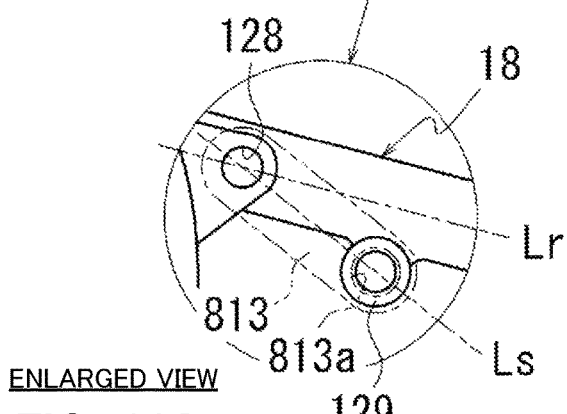

FIGS. 11 and 11A are diagrams illustrating the rib 18 and is an enlarged view of a region A in FIG. 3.

Figure 12:
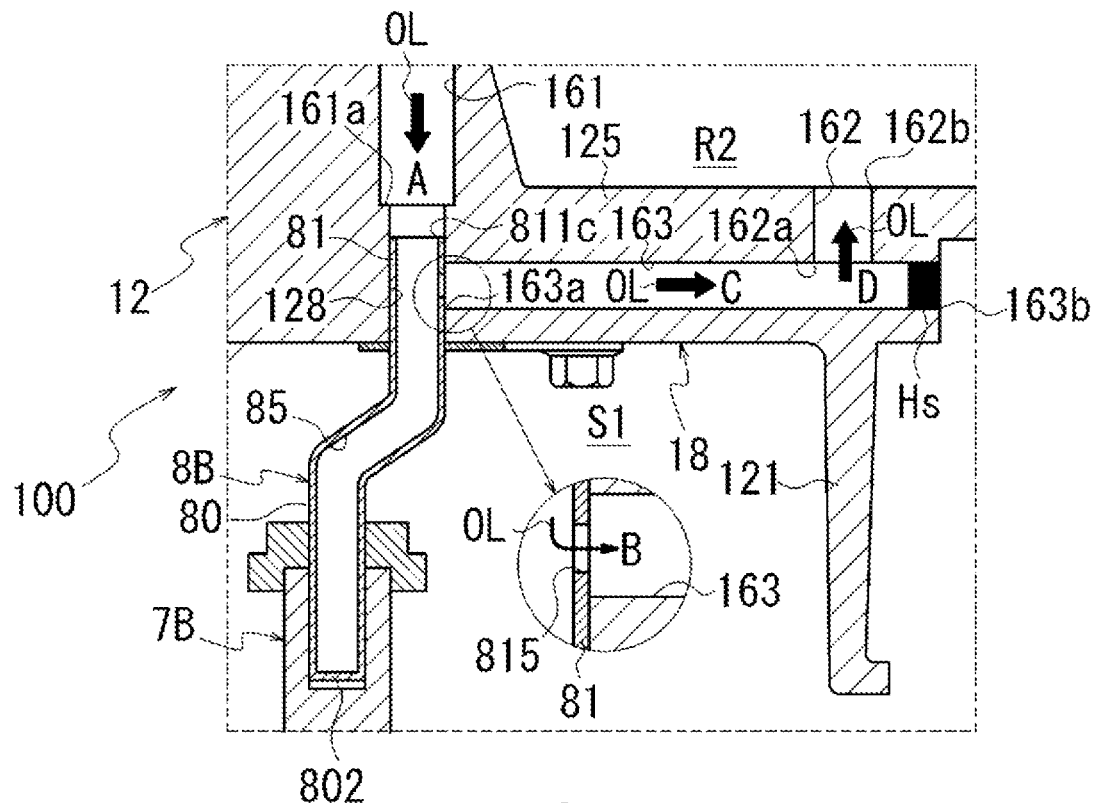
FIG. 12 is a diagram illustrating an in-case oil passage.

FIG. 12 is a diagram illustrating the in-case oil passage 16 formed in the rib 18 and is a schematic view of an A-A cross section in FIGS. 11 and 11A.

Figure 13:
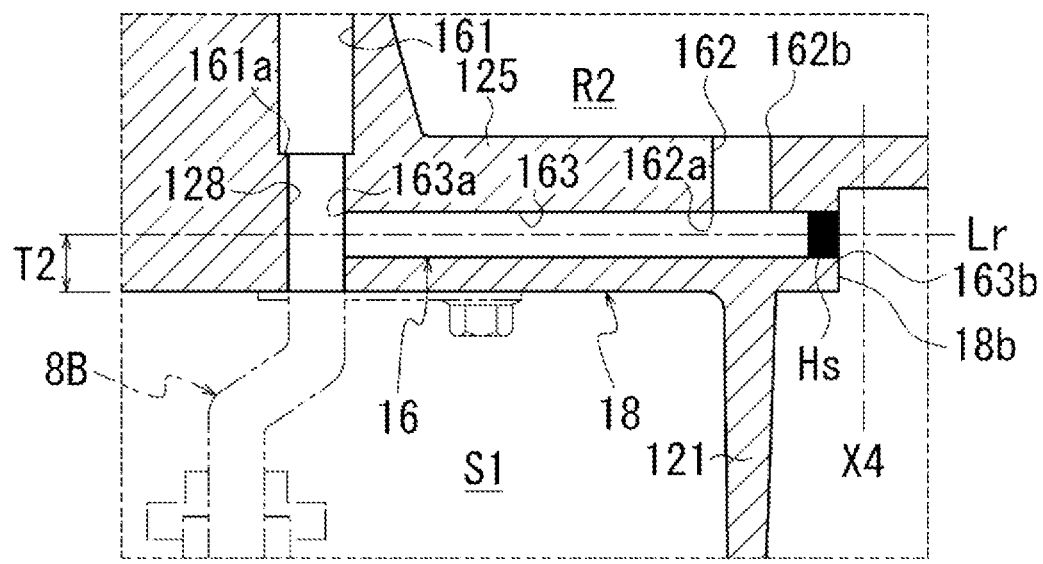
FIG. 13 is a diagram illustrating the in-case oil passage.

FIG. 13 is a diagram illustrating an arrangement of the tubular member 8B.

In FIG. 12, the tubular member 8B is indicated by imaginary lines. In addition, in FIGS. 12 and 13, the final gear 60 in the differential chamber R2 is omitted.

As illustrated in FIG. 11, the rib 18 protrudes from the intermediate wall portion 125 to the front side in the paper. The rib 18 is located below the straight line Lm1 connecting the rotation axis X1 and the rotation axis X2. The rib 18 is provided in an orientation along a straight line Lr. The straight line Lr is a line substantially parallel to a straight line Lm2 connecting the rotation axis X1 and the rotation axis X4. The rib 18 crosses the annular wall 121 from an inner side to an outer side. One end portion 18a (a left side in the diagram) of the rib 18 in a direction of the straight line Lr is located in the space S1 and is located in a vicinity of the through hole 125a. The other end 18b (a right side in the diagram) of the rib 18 in the direction of the straight line Lr is located outside the space S1 and is located in a vicinity of the through hole 125c.

The insertion hole 128 and the boss portion 129 described above are formed on one end portion 18a side (the left side in the diagram) of the rib 18. The insertion hole 128 is located on the straight line Lr. The boss portion 129 is located below the straight line Lr on the other end 18b side of the rib 18 when viewed from the insertion hole 128.

As illustrated in FIG. 12, the in-case oil passage 16 is formed in the rib 18.

When viewed from the direction of the rotation axis X4, the in-case oil passage 16 extends in a radial direction of the rotation axis X4 in a region overlapping the differential chamber R2. In FIG. 4, a position of the in-case oil passage 16 is indicated by a broken line.

As illustrated in FIG. 12, the in-case oil passage 16 includes an outer-diameter side oil passage 161, an inner-diameter side oil passage 162, and a connection oil passage 163.

The outer-diameter side oil passage 161 is provided in an orientation along the rotation axis X4. One end 161a of the outer-diameter side oil passage 161 communicates with the insertion hole 128. The other end 161b of the outer-diameter side oil passage 161 is opened in the arc-shaped wall 123 described above (see FIG. 4).

The insertion hole 128 communicating with the one end 161a of the outer-diameter side oil passage 161 is provided in series with the outer-diameter side oil passage 161 in the orientation along the rotation axis X4. The insertion hole 128 and the outer-diameter side oil passage 161 are concentrically arranged.

An end portion of the insertion hole 128 on a side opposite to the outer-diameter side oil passage 161 in the direction of the rotation axis X4 (a lower side in FIG. 12) is opened in the surface of the intermediate wall portion 125 (the rib 18). The outer-diameter side oil passage 161 of the in-case oil passage 16 communicates with the space S1 via the insertion hole 128. The insertion hole 128 constitutes a part of the in-case oil passage 16.

One end 163a of the connection oil passage 163 is opened at an intermediate position of the insertion hole 128 in the direction of the rotation axis X4. The intermediate position of the insertion hole 128 is between one end and the other end of the insertion hole 128 in the direction of the rotation axis X4.

The connection oil passage 163 extends in the rib 18 in the direction of the straight line Lr (a left-right direction in FIG. 12). The other end 163b of the connection oil passage 163 opens toward an outside of the annular wall 121. An opening of the other end 163b is sealed with a plug Hs. Examples of the plug Hs include a known hollow set.

One end 162a of the inner-diameter side oil passage 162 is opened on the other end 163b side of the connection oil passage 163.

The inner-diameter side oil passage 162 is located radially inward of the outer-diameter side oil passage 161 in the radial direction of the rotation axis X4. The inner-diameter side oil passage 162 extends in the direction of the rotation axis X4, and the other end 162b is opened to the differential chamber R2 (see FIG. 4).

Here, as illustrated in an enlarged region in FIG. 11A, a straight line Ls connecting the insertion hole 128 and the boss portion 129 is inclined with respect to the straight line Lr.

The inclination of the straight line Lr with respect to the straight line Ls is the same as the inclination (see FIG. 9) of the straight line Lq with respect to the straight line Lp in the bracket 813 of the tubular member 8B described above.

In addition, as illustrated in FIG. 12, a distance between a surface of the rib 18 and the straight line Lr in the direction of the rotation axis X4 is set to T2. The distance T2 is the same as the distance T1 (see FIG. 7) between the bracket 813 of the tubular member 8B and the through hole 815 described above (T2=T1).

As illustrated in FIG. 13, the second tubular portion 81 of the tubular member 8B is inserted into the insertion hole 128. The oil passage 85 in the tubular member 8B communicates with the outer-diameter side oil passage 161 via the opening end 811c.

Then, as illustrated in the enlarged region of FIG. [11] 11A, in a state where the second tubular portion 81 is inserted into the insertion hole 128, the bracket 813 is fixed to the boss portion 129. The straight line Lp (see FIG. 9) along the longitudinal direction of the bracket 813 is disposed at a position that coincides with the straight line Ls connecting the insertion hole 128 and the boss portion 129.

In this state, the straight line Lq (see FIG. 9) connecting a center of the second tubular portion 81 and the through hole 815 coincides with the straight line Lr passing through a center of the connection oil passage 163.

Accordingly, the internal space of the second tubular portion 81 communicates with the connection oil passage 163 via the through hole 815. Therefore, the oil passage 85 in the tubular member 8B communicates with the connection oil passage 163 via the through hole 815 (see the enlarged region in FIG. 13).

As described above, the insertion hole 128 constitutes a part of the in-case oil passage 16. Therefore, by inserting the tubular member 8B into the insertion hole 128, the oil passage 85 in the tubular member 8B also constitutes a part of the in-case oil passage 16. The oil passage 85 serves as an oil passage interposed between the outer-diameter side oil passage 161 and the connection oil passage 163 (see FIG. 13).

A part of the lubricating oil OL that is raised by the rotation of the final gear 60 flows from the other end 161b (see FIG. 4) of the outer-diameter side oil passage 161, and moves from an one end 161a side into the oil passage 85 in the tubular member 8B (an arrow A in FIG. 13).

One end (a lower side in FIG. 13) of the oil passage 85 is sealed by the bottom wall portion 802. Then, the lubricating oil OL sequentially flows into the oil passage 85 from an opening end 811c side. Therefore, an inside of the oil passage 85 is finally filled with the lubricating oil OL.

When the oil passage 85 is filled with the lubricating oil OL and the lubricating oil OL further flows into the oil passage 85 from the opening end 811c side, a pressure in the oil passage 85 increases. The lubricating oil OL is discharged from the through hole 815 to the connection oil passage 163. Accordingly, a flow of the lubricating oil OL that flows from the outer-diameter side oil passage 161 to the connection oil passage 163 through the oil passage 85 is formed (an arrow B in FIG. 13).

The lubricating oil OL moved from the through hole 815 to the connection oil passage 163 moves from one end 163a side to the other end 163b side through the connection oil passage 163 (an arrow C in FIG. 13).

The other end 163b of the connection oil passage 163 is sealed with the plug Hs. Therefore, an orientation of the lubricating oil OL that moves through the connection oil passage 163 is changed by the plug Hs, and the lubricating oil OL moves from the one end 162a to the inside of the inner-diameter side oil passage 162.

The lubricating oil OL passing through the inner-diameter side oil passage 162 is returned from the other end 162b to the differential chamber R2 (an arrow D in FIG. 13). The lubricating oil OL returned to the differential chamber R2 is again raised by the rotation of the final gear 60 (see FIG. 4).

Here, the case 12 is manufactured by casting. Although not illustrated, the in-case oil passages 15 and 16 in the case 12 are formed by placing cores at predetermined positions in a mold at the time of casting the case 12 and then pouring and solidifying molten metal. The cores have shapes corresponding to the in-case oil passages 15 and 16.

In order to maintain attitudes of the cores in the mold, a part of the cores is abutted on the mold. Therefore, in the case 12 after solidification, portions where the cores and the mold are abutted appear as opening portions of the in-case oil passages 15 and 16.

As illustrated in FIG. 11 FIGS. 11 and 11A, in the present embodiment, the insertion holes 126 and 128 and the other end 163b side (see FIG. 12) of the connection oil passage 163 correspond to the opening portions of the in-case oil passages 15 and 16.

The in-case oil passage 15 is used to supply the lubricating oil OL to a variator 4 side. Therefore, the insertion hole 126 serving as the opening portion of the in-case oil passage 15 is used in an open state.

On the other hand, the in-case oil passage 16 is used to return the lubricating oil OL to the differential chamber R2.

In order to reliably return the lubricating oil OL to the differential chamber R2, the insertion hole 128 serving as the opening portion of the in-case oil passage 16 and the other end 163b side of the connection oil passage 163 are sealed with a sealing member.

As illustrated in FIG. 13, the tubular member 8B is inserted into the insertion hole 128. The plug Hs is inserted into the other end 163b of the connection oil passage 163. In the present embodiment, each of the tubular member 8B and the plug Hs corresponds to the sealing member.

For example, when the tubular member 8B is attached to a place other than the insertion hole 128 in the case 12, a plug for sealing the insertion hole 128 is separately prepared. Then, the number of plugs (the number of components) to be used increases.

On the other hand, the tubular member 8B according to the present embodiment is inserted into the insertion hole 128 in the case 12 (see FIG. 13). Accordingly, the tubular member 8B supports the chain guide support shaft 7B and blocks the communication between the in-case oil passage 16 and the space S1 implemented via the insertion hole 128.

That is, the tubular member 8B serves both as a support member and a plug. The plug for sealing the insertion hole 128 may not be separately used.

Even if a solid shaft member not including the oil passage 85 and the through hole 815 is used instead of the tubular member 8B, the shaft member can both serve as the support member for the chain guide support shaft 7B and the plug for the insertion hole 128. However, when the shaft member is inserted into the insertion hole 128, the flow of the lubricating oil OL from the outer-diameter side oil passage 161 to the connection oil passage 163 may be hindered. In this case, it is also conceivable to shallowly insert the shaft member into the insertion hole 128 such that the lubricating oil OL can flow. However, a support strength for supporting the chain guide support shaft 7B is reduced.

The tubular member 8B according to the present embodiment is a hollow steel pipe and includes the oil passage 85 and the through hole 815. In the tubular member 8B, the oil passage 85 and the through hole 815 constitute a part of the in-case oil passage 16. Therefore, even if the tubular member 8B is deeply inserted into the insertion hole 128, the flow of the lubricating oil OL in the in-case oil passage 16 is not hindered. Accordingly, the support strength for supporting the chain guide support shaft 7B can be improved.

An example of the continuously variable transmission 1 (the hydraulic actuation device) according to an aspect of the invention will be listed below.

(1) The continuously variable transmission 1 includes:
the case 12;
the in-case oil passage 16 (an oil passage) provided in the case 12; and
the tubular member 8B (a support member) that is provided in the case 12 and supports the chain guide support shaft 7B (a supported member).

The in-case oil passage 16 includes the insertion hole 128 (an opening portion) that allows the in-case oil passage 16 to communicate with the space S1 inside the case 12.

The tubular member 8B is inserted into the insertion hole 128.

The communication between the in-case oil passage 16 and the space S1 inside the case 12 is blocked by the tubular member 8B.

When configured as described above, the tubular member 8B can seal the insertion hole 128 while supporting the chain guide support shaft 7B.

Accordingly, it is not necessary to use the support member for supporting the chain guide support shaft 7B and the plug for sealing the insertion hole 128, thereby reducing the number of components.

(2) The tubular member 8B inserts the second tubular portion 81 into the insertion hole 128 from the direction of the axis line Lx3. The tubular member 8B is fixed to the case 12 in a state where a tightening force (a pressing force) of the bolt B (a fastening member) is applied along the direction of the axis line Lx4 parallel to the direction of the axis line Lx3 (an insertion direction).

The tubular member 8B receives a pressure from the lubricating oil OL that flows into the oil passage 85 from the outer-diameter side oil passage 161 of the in-case oil passage 16. This pressure acts in a direction in which the tubular member 8B is pulled out from the insertion hole 128 (downward in FIG. 13).

Therefore, when configured as described above, the fastening force of the bolt B applied to the tubular member 8B is in a direction against the pressure received from the lubricating oil OL.

Accordingly, the tubular member 8B is prevented from being pulled out from the insertion hole 128, and sealing performance of the insertion hole 128 by the tubular member 8B can be improved.

(3) The in-case oil passage 16 is a lubricating oil passage for supplying the lubricating oil OL to the differential chamber R2.

The insertion hole 128 provided in the in-case oil passage 16 is sealed by the tubular member 8B.

When the insertion hole 128 is opened on the space S1 side, a part of the lubricating oil OL in the in-case oil passage 16 leaks to the space S1 side. Then, an amount of the lubricating oil OL returned to the differential chamber R2 decreases. In addition, when the insertion hole 128 is sealed with a separate plug, the number of components increases.

Therefore, by configuring as described above, the increase in the number of components can be reduced while reliably returning the lubricating oil OL, which is raised by the rotation of the final gear 60, to the differential chamber R2.

(4) The continuously variable transmission 1 includes:
the primary pulley 41 and the secondary pulley 42 that constitute a pair of pulleys; and
the chain 43 (an endless annular member) wound around the primary pulley 41 and the secondary pulley 42.

The chain guide 9B coupled to the chain guide support shaft 7B is a guide member that guides the chain 43.

The tubular member 8B supports the chain guide support shaft 7B coupled to the chain guide 9B.

When configured as described above, in the chain continuously variable transmission 1, the number of components to be used can be reduced.

(5) The tubular member 8B has a bottomed tubular shape, and includes the bottom wall portion 802, the first tubular portion 80 surrounding the bottom wall portion 802, the connection portion 82, and the second tubular portion 81.

In the tubular member 8B, the through hole 815 penetrating the tubular wall portion 811 is formed in the tubular wall portion 811 (a side wall) of the second tubular portion 81.

The tubular member 8B is inserted into the insertion hole 128 from the opening end 811c side of the second tubular portion 81, and the through hole 815 communicates with the connection oil passage 163 of the in-case oil passage 16.

The lubricating oil OL in the in-case oil passage 16 flows into the oil passage 85 (an internal space) of the tubular member 8B from the outer-diameter side oil passage 161 through the opening end 811c, and then is discharged from the through hole 815 to the connection oil passage 163.

When configured as described above, the oil passage 85 in the tubular member 8B serves as a part of the in-case oil passage 16. Accordingly, the flow of the lubricating oil OL in the in-case oil passage 16 can be smoothly changed.

In addition, even if the tubular member 8 is deeply inserted into the insertion hole 128, the flow of the lubricating oil OL is not hindered. Accordingly, the support strength for supporting the chain guide support shaft 7B can be improved.

In a support structure 100 in the case 12 (see FIG. 13) for the tubular member 8B, one tubular member 8B can support the chain guide support shaft 7B and seal the insertion hole 128.

The support structure 100 of the tubular member 8B includes:
the case 12;
the in-case oil passage 16 provided in the case 12; and
the tubular member 8B that is provided in the case 12 and supports the chain guide support shaft 7B.

The in-case oil passage 16 includes the insertion hole 128 that allows the in-case oil passage 16 to communicate with the space S1 inside the case 12.

The tubular member 8B is inserted into the insertion hole 128.

The tubular member 8B is supported by the case 12 while blocking the communication between the in-case oil passage 16 and the space S1 inside the case 12.

When configured as described above, the tubular member 8B can seal the insertion hole 128 while supporting the chain guide support shaft 7B.

Accordingly, it is not necessary to use the support member for supporting the chain guide support shaft 7B and the plug for sealing the insertion hole 128, thereby reducing the number of components.

In the continuously variable transmission 1 according to the present embodiment, a case in which the opening end 811c of the tubular member 8B communicates with the outer-diameter side oil passage 161 of the in-case oil passage 16, and the through hole 815 communicates with the connection oil passage 163 is exemplified, but the invention is not limited to the aspect. For example, the following modification may be made.

Figure 14:
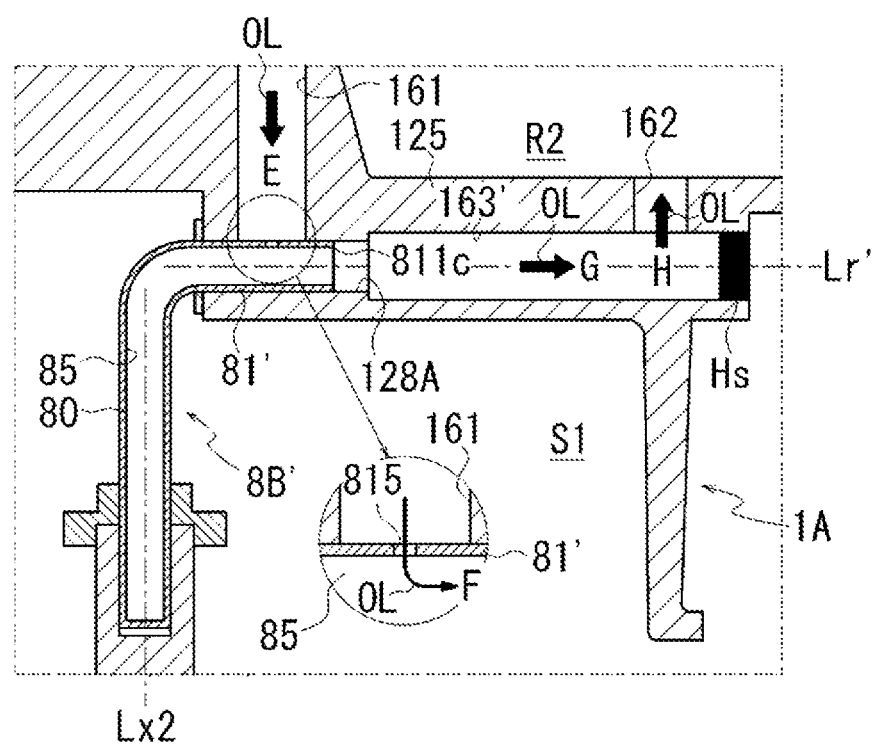
FIG. 14 is a diagram illustrating a continuously variable transmission according to a modification.

FIG. 14 is a diagram illustrating a continuously variable transmission 1A according to a modification.

In the continuously variable transmission 1A according to the modification, only a portion different from the continuously variable transmission 1 according to the present embodiment will be described.

As illustrated in FIG. 14, in the continuously variable transmission 1A, an insertion hole 128A extends in a direction of a straight line Lr' orthogonal to the axis line Lx2 and is connected in series with a connection oil passage 163'. The outer-diameter side oil passage 161 is connected to an intermediate position of the insertion hole 128A in the direction of the straight line Lr'. The intermediate position of the insertion hole 128A is between one end and the other end of the insertion hole 128A in the direction of the straight line Lr'.

A tubular member 8B' is formed by bending one steel pipe at one location between one end and the other end in a longitudinal direction thereof and has a substantially L-shape.

Specifically, the tubular member 8B' includes the first tubular portion 80 disposed in the orientation along the straight line Lx2, and a second tubular portion 81' disposed in an orientation along the straight line Lr'.

When the second tubular portion 81' of the tubular member 8B' is inserted into the insertion hole 128A, the through hole 815 communicates with the outer-diameter side oil passage 161 of the in-case oil passage 16, and the opening end 811c communicates with the connection oil passage 163'.

In the continuously variable transmission 1A according to the modification, the lubricating oil OL flows into the oil passage 85 in the tubular member 8B' from the outer-diameter side oil passage 161 through the through hole 815. The lubricating oil OL is discharged from the opening end 811c to the connection oil passage 163'. Then, the lubricating oil OL is discharged from the connection oil passage 163' to the differential chamber R2 through the inner-diameter side oil passage 162 (see arrows E to H in FIG. 14).

As an aspect of the invention, the continuously variable transmission 1A has, for example, the following configuration.

(5) The tubular member 8B' has a bottomed tubular shape.

In the tubular member 8B', the through hole 815 penetrating the tubular wall portion 811 is formed in the tubular wall portion 811 (a side wall) of the second tubular portion 81'.

The tubular member 8B' is inserted into the insertion hole 128A from the opening end 811c side of the second tubular portion 81, and the through hole 815 communicates with the outer-diameter side oil passage 161 of the in-case oil passage 16.

The lubricating oil OL in the in-case oil passage 16 flows into the oil passage 85 in the tubular member 8B' from the outer-diameter side oil passage 161 through the through hole 815, and then is discharged from the opening end 811c to the connection oil passage 163'.

When configured as described above, the oil passage 85 in the tubular member 8B' serves as a part of the in-case oil passage 16. Accordingly, the flow of the lubricating oil OL in the in-case oil passage 16 can be smoothly changed.

In the present embodiment, the chain continuously variable transmission 1 in which the endless annular member is the chain 43 is exemplified, but the invention is not limited to the aspect. For example, a belt continuously variable transmission in which the endless annular member is a belt may be used. Examples of the belt include a belt in which a plurality of plate-shaped elements are stacked and annularly arranged. Specifically, the element includes slits on both sides. The belt is formed by binding each element by an annular ring having a slit inserted therethrough.

In the present embodiment, a case in which the hydraulic actuation device is a chain continuously variable transmission for a vehicle is exemplified, but the invention is not limited to the aspect. In a case of a hydraulic actuation device in which an oil passage is provided in a case, the hydraulic actuation device can also be applied to others in addition to the vehicle.

Although the embodiment of the invention has been described above, the above embodiment merely exemplifies one application example of the invention and does not intend to limit the technical scope of the invention to the specific configuration of the above embodiment. The embodiment can be changed as appropriate within the scope of the technical idea of the invention.

REFERENCE SIGNS LIST

1 continuously variable transmission (hydraulic actuation device)
1A continuously variable transmission (hydraulic actuation device)
12 case
128 insertion hole (opening portion)
128A insertion hole (opening portion)
16 in-case oil passage
41 primary pulley
42 secondary pulley
43 chain (endless annular member)
7B chain guide support shaft (supported member)
8B tubular member (support member)
8B' tubular member (support member)
9B chain guide (guide member)
802 bottom wall portion
811 tubular wall portion
811c opening end
815 through hole
85 oil passage (internal space)
B bolt (fastening member)
Lx3 axis line (insertion direction)
OL lubricating oil
S1 space The present application claims a priority of Japanese Patent Application No. 2021-026686 filed with the Japan Patent Office on Feb. 22, 2021, all the contents of which are hereby incorporated by reference.

The invention claimed is:

1. A hydraulic actuation device comprising:
a case;
an oil passage provided in the case; and
a support member provided in the case and configured to support a supported member, wherein
the oil passage includes an opening portion that allows the oil passage to communicate with a space inside the case,
the support member is inserted into the opening portion, and
a communication between the oil passage and the space inside the case is blocked by the support member.

2. The hydraulic actuation device according to claim 1, wherein
the support member is fixed to the case by a fastening member in a state where a pressing force along a direction in which the support member is inserted into the opening portion of the oil passage is applied.

3. The hydraulic actuation device according to claim 1, wherein
the oil passage is a lubricating oil passage for supplying lubricating oil.

4. The hydraulic actuation device according to claim 1, wherein
the hydraulic actuation device is a continuously variable transmission,
the continuously variable transmission includes
a pair of pulleys, and
an endless annular member wound around the pair of pulleys,
the supported member is a guide member that guides the endless annular member, and
the support member supports the guide member.

5. The hydraulic actuation device according to claim 1, wherein
the support member has a bottomed tubular shape,
a through hole penetrating a side wall of the support member is formed in the side wall, the support member is inserted into the opening portion of the oil passage from an opening end side, and the through hole communicates with the oil passage, and oil in the oil passage flows into an internal space of the support member from any one of an opening end and the through hole, and then is discharged to the oil passage from the other of the opening end and the through hole.

\* \* \* \* \*